US006463660B1

(12) United States Patent
Mason

(10) Patent No.: US 6,463,660 B1
(45) Date of Patent: Oct. 15, 2002

(54) PROCESS FOR FORMING A VEHICLE WHEEL DISC DIRECTLY UPON A VEHICLE WHEEL RIM

(75) Inventor: Douglas P. Mason, Livonia, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/422,686

(22) Filed: Oct. 21, 1999

Related U.S. Application Data

(63) Continuation of application No. PCT/US98/08295, filed on Apr. 24, 1998.
(60) Provisional application No. 60/044,603, filed on Apr. 24, 1997.

(51) Int. Cl.[7] .............................................. B23P 17/00
(52) U.S. Cl. .............................. 29/894.322; 29/527.7; 164/98
(58) Field of Search .......................... 29/894.322, 527.7; 164/98

(56) References Cited

U.S. PATENT DOCUMENTS

| | | | | |
|---|---|---|---|---|
| 4,487,456 A | * | 12/1984 | Zulauf ........................ 301/63.1 |
| 4,773,467 A | * | 9/1988 | Graham et al. ........... 164/122.1 |
| 4,977,947 A | * | 12/1990 | Boswell et al. ............ 164/71.1 |
| 5,433,511 A | * | 7/1995 | Wei ............................. 301/65 |
| 5,526,977 A | * | 6/1996 | Wei ........................ 29/894.322 |

* cited by examiner

Primary Examiner—P. W. Echols
(74) Attorney, Agent, or Firm—MacMillan, Sobanski & Todd, LLC

(57) ABSTRACT

A process for casting or forging a wheel disc upon the end of a metal hoop. The metal hoop is then formed into a wheel rim. The rim and disc are machined to assure concentric tire bead seats.

1 Claim, 9 Drawing Sheets

PROCESS FOR FORMING A VEHICLE WHEEL DISC DIRECTLY UPON A VEHICLE WHEEL RIM

CROSS REFERENCE TO RELATED APPLICATIONS

This application claims the benefit of U.S. Provisional Application No. 60/044,603, filed on Apr. 24, 1997 and PCT Patent Application No. PCT/US98/08295 filed Apr. 24, 1998.

BACKGROUND OF THE INVENTION

This invention relates in general to vehicle wheels and in particular to a process for fabricating a two piece vehicle wheel which includes forming a wheel disc upon the outboard end of a partial wheel rim.

It is known in the art to fabricate a two piece vehicle wheel by attaching a wheel disc to a separately formed wheel rim. Typically, the wheel disc is cast or forged while the rim is rolled or spun from strip stock. Such two piece wheels are less expensive to manufacture than a cast one piece wheel while permitting use of stylistic designs for the wheel disc.. Both the wheel disc and rim can be formed from alloys of the same light weight metal, such as aluminum, magnesium or titanium, or, as a further cost reduction, a wheel disc formed from an alloy of a light weight metal can be attached to a rim rolled from steel. When different metals are used to form the wheel disc and wheel rim, the wheel is commonly called a bimetal wheel.

To further improve the appearance of the wheel, the wheel disc can be formed to include the outboard tire bead retaining flange. The resulting wheel disc, which is called a full face wheel disc, is attached to the outboard end of a partial wheel rim. The attachment can occur at the outboard tire bead seat, the deepwell, or another location. The assembled wheel is often referred to as a full face wheel. When a tire is mounted upon a full face wheel, the joint between the wheel disc and wheel rim is completely hidden and only the wheel disc is visible. A decorative finish is often applied to the face of the wheel disc to further enhance the appearance of the wheel. Examples of typical decorative finishes include metal plating, such as chromium plating, paint and clear coatings.

Referring now to the drawings, there is shown in FIG. 1 a fragmentary sectional view of a typical prior art full face wheel 10. The wheel includes a full face wheel disc 11 formed from a light weight metal or light weight metal alloy by a conventional process, such as gravity, low pressure or die casting, or forging. The full face wheel disc 11 includes a wheel hub 12 having a central pilot hole 13 and a plurality of wheel lug holes 14 (one shown) formed therethrough. The hub 12 is supported by a plurality of wheel spokes 15 (one shown) within an annular sidewall 16. An outboard tire bead retaining flange 17 extends in a radial outward direction from the sidewall 16. An outboard tire bead seat 18 is formed in the sidewall 16 adjacent to the retaining flange 17. The sidewall 16 further includes an outboard tire safety bead 19 formed between the tire bead seat 18 and a cylindrical collar 20 which forms a portion of a deepwell 21. The collar 20 extends axially from the inboard surface of the sidewall 16.

A conventional partial wheel rim 23 is attached to the inboard side of the wheel disc 11. The wheel rim 23 can be formed from a strip of light weight metal or steel with conventional rim roll forming machinery. The wheel rim 23 includes a cylindrical outboard end 24 which forms a portion of the deepwell 21. A leg portion 24 extends axially from the drop well 21 to an inboard tire safety bead 26. An inboard tire bead seat 27 is formed adjacent to the safety bead 26. The inboard end of the wheel rim 24 terminates in a conventional inboard tire bead retaining flange 28.

An air-tight continuous circumferential weld 29 is formed between the outboard end of the wheel rim 24 and the wheel disc collar 20. The weld 29 shown in FIG. 1 is formed by a conventional electron beam or arc welding process. Alternately, a conventional friction or inertial welding process can be used to form the weld 29. During the friction welding process, the wheel disc 11 is held stationary while the wheel rim 23 is rotated with the outboard rim end 24 pressed against the wheel disc collar 20 The heat generated by friction partially melts the outboard wheel rim end 24 and the adjacent portion of the collar 20 to form the weld 29. For a bimetal wheel, a ring-shaped weld anchor (not shown) formed from a ferrous material, such as steel, can be partially embedded in the wheel disc sidewall 16. A portion of the weld anchor is exposed to form a welding surface.

Referring now to FIG. 2, there is shown a flow chart for a known manufacturing process for fabricating the full face wheel illustrated in FIG. 1. In functional block 30 a full face wheel disc is formed by a conventional process, such as casting or forging. The wheel disc is heat treated in functional block 31 and then machined to final shape in functional block 32.

While the wheel disc is being formed, a flat strip of metal is rolled into a circular hoop and the ends butt welded together in functional block 35. The hoop is formed into a partial wheel rim in functional block 36 by a conventional process, such as rolling or spinning.

In functional block 37, the partial wheel rim is attached to the wheel disc formed in functional blocks 30 through 32 by a conventional welding process. The wheel rim is usually welded to the wheel disc. Typically, it is difficult to weld the hoop coaxially with the wheel disc axis so that the inboard and outboard tire bead seats are concentric to one another. If the outboard and inboard tire bead seats of the assembled wheel are outside the required tolerance limits for concentricity, undesirable vibrations may occur when the wheel is mounted upon a vehicle and the vehicle operated. Accordingly, the tire bead seats of the assembled wheel are machined in functional block 38 to assure that the required amount of concentricity is achieved.

SUMMARY OF THE INVENTION

This invention relates to an improved process for fabricating a two piece vehicle wheel which includes forming a wheel disc upon the outboard end of a partial wheel rim.

As described above, a two piece vehicle wheel is typically fabricated by welding a preformed wheel rim to a finished wheel disc. It is usually difficult to weld the rim concentrically onto the disc. Accordingly, it would be desirable if a two piece wheel could be fabricated without welding. It would also be desirable to eliminate the weld between the wheel rim and wheel disc to simplify the manufacturing process while reducing costs.

The present invention contemplates a process for fabricating a vehicle wheel which includes an annular hoop of metal. The metal hoop is then in a wheel disc mold and a wheel disc is cast on the end thereof. The wheel disc casting and metal hoop are removed from the wheel disc mold and finished to form a vehicle wheel. The finishing can include forming the metal hoop into a wheel rim and machining the wheel disc casting. The metal hoop can be either cylindrical or flared.

The invention further contemplates that wheel disc mold defines a mold cavity and further that the mold can includes at least one optional supplemental heating element. During the casting operation, the supplemental heating element supplies additional heat to the mold cavity. Additionally, either the mold or the hoop can be optionally vibrated during the casting operation.

Alternately, the metal hoop can be mounted in die set for forging a wheel disc. A heated metal billet is placed into the die set and the die set closed to forge a wheel disc upon an end of the metal hoop. The hoop and wheel disc are then removed from the die set and the hoop formed into a wheel rim.

The invention also contemplates casting or forging a wheel disc upon the outboard end of a partial wheel rim.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
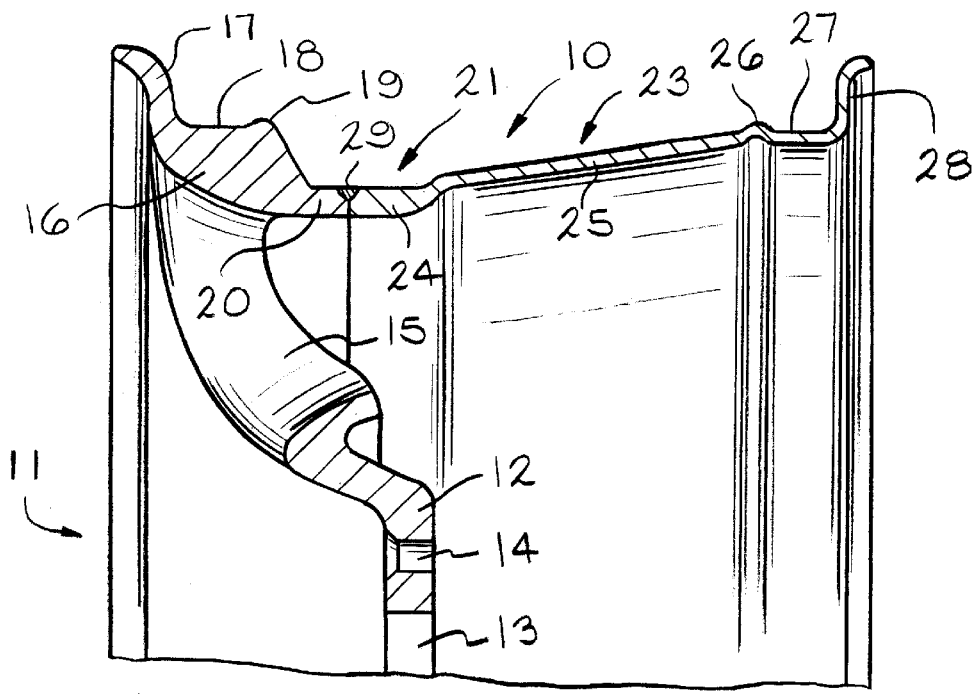
FIG. 1 is a fragmentary sectional view of a two piece vehicle wheel.
Figure 4:
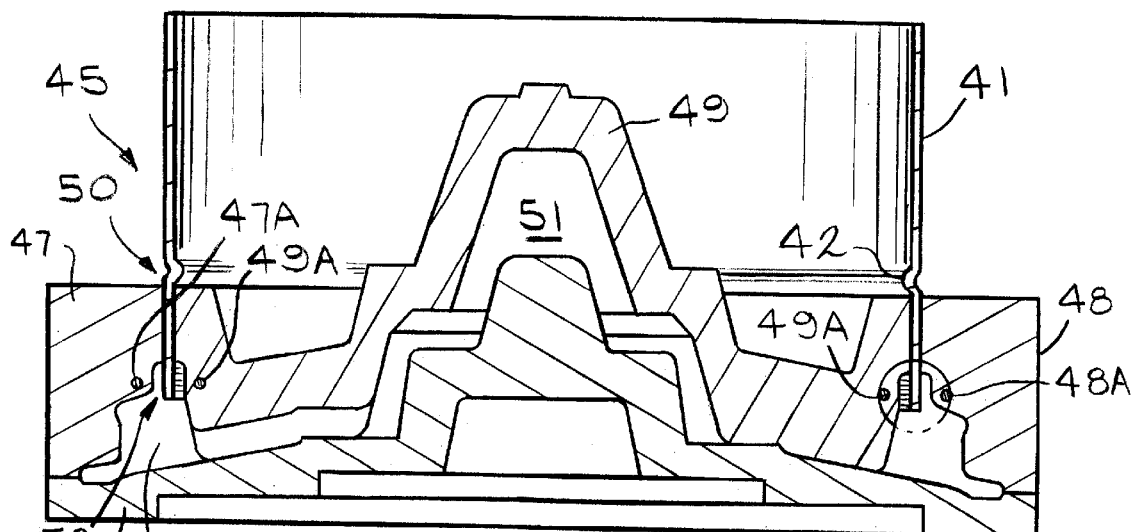
FIG. 4 is a sectional view of a wheel disc mold used in the process illustrated in FIG. 3.
Figure 3:
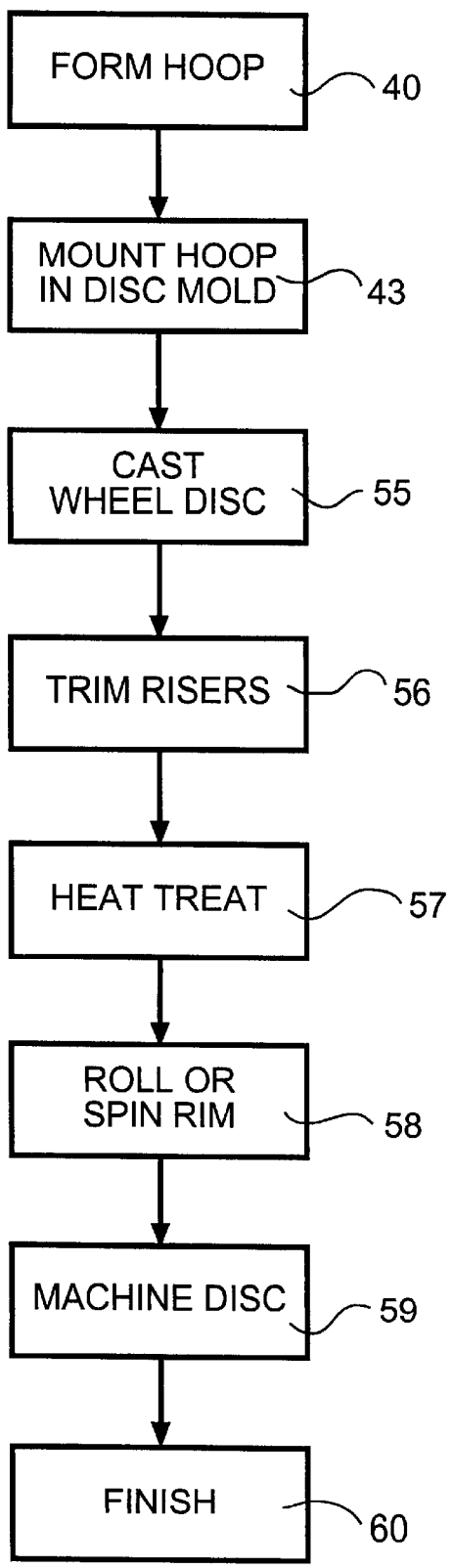
FIG. 3 is a flow chart for a process for fabricating a vehicle wheel in accordance with the invention.

Referring again to the drawings, there is illustrated in FIG. 3 a flow chart for an improved process for fabricating a two piece vehicle wheel in accordance with the present invention. In functional block 40, a strip of metal is rolled into a cylindrical hoop 41 and the ends butt welded. An alloy of a light weight metal, such as aluminum, magnesium or titanium can be used to form the hoop 41. Alternately, the hoop 41 can be formed from an alloy of steel. An optional circumferential groove 42 can be rolled in the hoop 41, as shown in FIG. 4. The purpose for forming the groove 42 will be explained below. While the groove 42 is illustrated in FIG. 4 as extending in an inward radial direction, it will be appreciated that the invention also can be practiced with a circumferential bead formed in hoop 41 extending in an outward radial direction (not shown). Additionally, while the hoop 41 is rolled in the preferred embodiment, it will also be appreciated that the hoop 41 can be formed by any conventional method, such as, for example, spinning.

In functional block 43, the metal hoop 41 is mounted in a multi-piece wheel disc mold 45, as illustrated by the sectional view of the mold 45 and hoop 41 shown in FIG. 4. The wheel disc mold 43 includes a base member 46 which supports a pair of movable side members 47 and 48 which can be extended and retracted in a horizontal direction in FIG. 4. Each of the side members 47 and 48 includes an optional supplemental heating element segment labeled 47A and 48A, respectively. The heating element segments 47A and 48A have an arcuate shape and are of conventional design, such as inductive or electrical resistance heating elements. A movable top core 49 which can be extended and retracted in a vertical direction in FIG. 4 is disposed between the side members 47 and 48. Similar to the side members, the top core 49 includes an optional annular supplemental heating element 49A of a conventional design. The use of the supplemental heating segments 47A and 48A and heating element 49A will be discussed below. When the mold 45 is closed, as illustrated in FIG. 4, an annular opening 50 is formed between the side members 47 and 48 and the top core 49. Also, the base and side members, 46, 47 and 48, cooperate with the top core 49 to define a mold cavity 51 for casting a full face wheel disc (not shown). The mold cavity 51 includes an annular sidewall cavity 52 which corresponds to the sidewall of the wheel disc. The sidewall cavity 52 includes an annular portion 53 extending axially therefrom in an upward direction in FIG. 4. The annular portion 53 corresponds to a portion of a wheel drop well.

Mounting the metal hoop 41 within the wheel disc mold 45 begins by retracting the side members 47 and 48 and the top core 49. The hoop 41 is then positioned with one end extending over the outer circumference of the top core 49. If the optional groove 42 is present on the hoop 41, the groove 42 functions as a stop to position the hoop 41 upon the top core 49. The groove 42 cooperates with the top core 49 to establish the correct insertion depth of the hoop 41 into the annular portion 53 of the sidewall cavity 52. The side members 47 and 48 are extended toward the top core 49, clamping the hoop 41 against the top core 49. As shown in FIG. 4, the hoop 41 extends through the annular opening 50 and forms a seal between the side members 47 and 48 and the top core 49. The top core 49 and side members 47 and 48 are then extended, with the hoop 41, toward the base member 46 to close the mold 45. When the mold 45 is closed, as shown in FIG. 4, the lower end of the metal hoop 41 extends into the annular portion 53 of the sidewall cavity 52. The clamping of the side members 47 and 48 against the metal hoop 41 assures that the metal hoop 41 is positioned coaxially within the mold cavity 51.

Figure 4A:
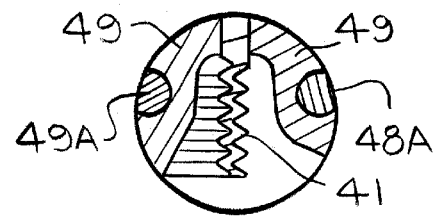
FIG. 4A is an enlarged portion of FIG. 4.
Figure 2:
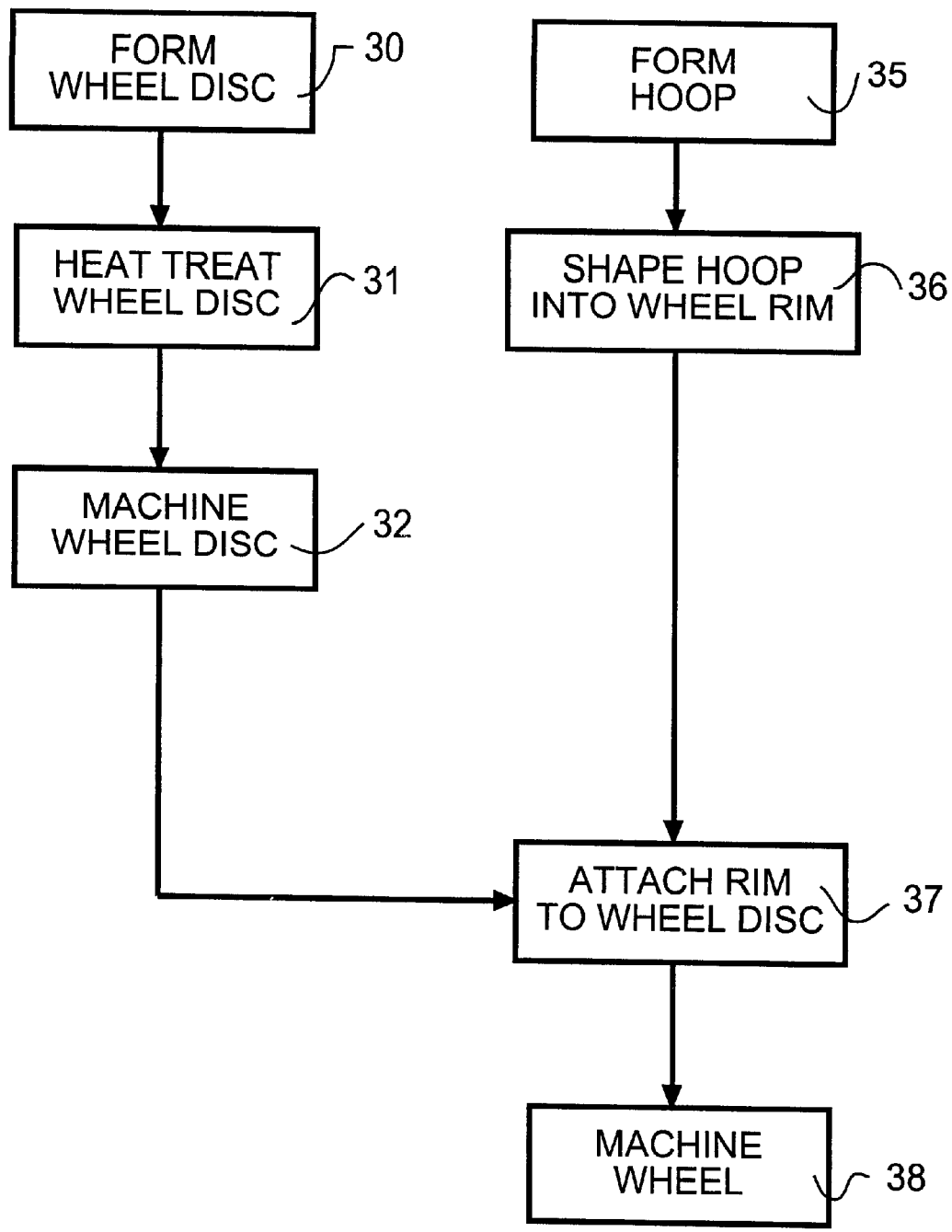
FIG. 2 is a flow chart for a known process for forming the two piece vehicle wheel shown in FIG. 1.

In functional block 55, molten metal is introduced to the mold cavity 51 through a sprue (not shown), by a conventional method, such as gravity or low pressure casting, to cast a wheel disc (not shown). The molten metal fills the sidewall cavity 52 and flows into the annular portion 53 thereof, covering and partially melting the surface of the lower end of the metal hoop 41. If included, the supplemental heating segments 47A and 48A and the supplemental heating element 49A provide additional heat energy to the annular portion 53 of the sidewall cavity 52 to assure partial melting of the end of the metal hoop 41. As the molten metal cools within the mold cavity 51 to form a wheel disc casting, the deepwell portion of the wheel disc casting is physically bonded to the lower end of the metal hoop 41, securely attaching the metal hoop 41 to the wheel disc casting. To further facilitate the attachment, a plurality of holes (not shown) can be formed through the lower end of the metal hoop 41. The molten metal fills the holes and, upon cooling, physically secures the lower end of the hoop 41 to the wheel disc casting. Additionally, the lower end of the hoop 41 can include serrations, as shown in FIG. 4A. The serrations increase the exposed surface area at the end of the hoop 41 and thereby strengthen the bond formed between the hoop 41 and the wheel disc casting. The metal in the wheel disc drop well portion 53 of the mold cavity 51 contracts as it cools, forming an air tight seal between the metal hoop 41 and the wheel disc casting.

After the wheel disc casting has cooled sufficiently, the top core 49 and the side members 47 and 48 are retracted allowing removal of the hoop 41 and wheel disc casting from the bottom member 46. The wheel disc casting is typically quenched. In functional block 56, any risers and sprues are trimmed from the wheel disc casting. The wheel disc casting is then heat treated by a conventional process as shown in functional block 57. In functional block 58, the hoop 41 is formed into a wheel rim by a conventional process, such as rolling or spinning. To facilitate the forming operation, the hoop 41 can be flared before rolling or spinning. The wheel disc casting is machined to a final shape in functional block 59. The combination of the forming of the wheel rim and machining of the wheel disc after the wheel disc is cast onto the end of the hoop 41 assures that the inboard and outboard tire bead seats of the finished wheel are concentric. A decorative finish, such as, for example plating, paint and/or clear coat are applied to the surface of the wheel disc in functional block 60; however, this step is optional.

Figure 5:
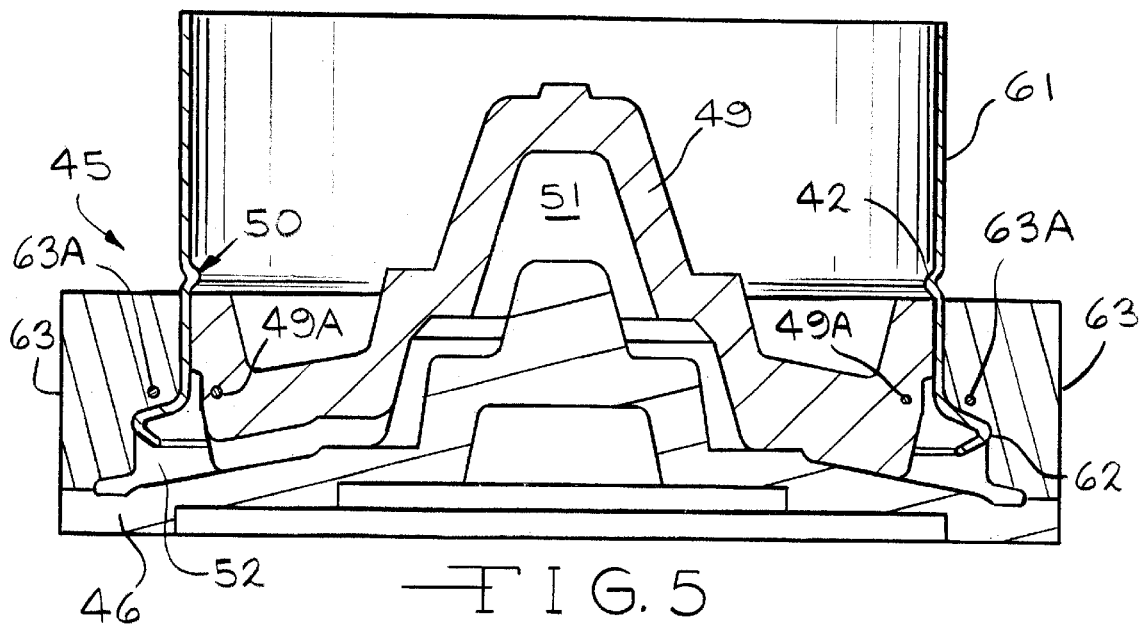
FIG. 5 is a sectional view of an alternate embodiment of the wheel disc mold shown in FIG. 4.

An alternate embodiment of the hoop 61 is illustrated in FIG. 5. Components shown in FIG. 5 which are similar to components shown in FIG. 4 have the same numerical designator. As shown in FIG. 5, the lower end of the hoop 61 is rolled or spun to include a tire safety bead 62. The wheel disc mold 45 includes modified side members 63 which conform to the shape of the lower end of the hoop 61. Optionally, a plurality of holes (not shown) can be formed through the lower end of the hoop 61. During the casting of the wheel disc in functional block 55, in FIG. 3, molten metal fills the holes. Upon cooling, the metal filled holes help to secure the wheel disc upon the end of the hoop 61. While the preferred embodiment has been illustrated with a safety bead seat formed upon the end of the hoop 61, it will be appreciated that the invention also can be practiced with other portions of a wheel formed upon the end of the hoop 61. For example, a tire bead retaining flange (not shown) can be formed upon the lower end of the hoop 61.

Figure 6:
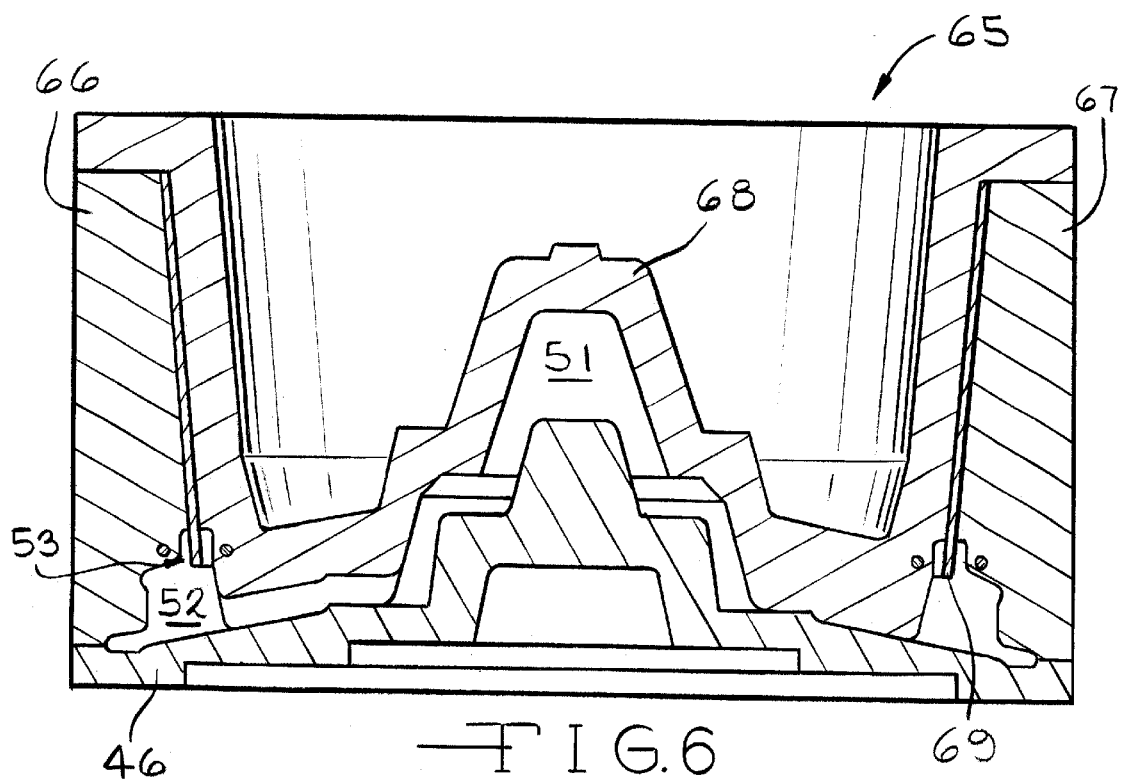
FIG. 6 is a sectional view of an alternate wheel disc mold used in the process illustrated in FIG. 3.

An alternate embodiment of the wheel disc mold is illustrated at 65 in FIG. 6. Components of the mold 65 shown in FIG. 6 which are similar to components of the mold 45 shown in FIG. 5 have the same numerical designators. As shown in FIG. 6, the mold 65 includes side members 66 and 67 and a top core 68 which have a greater height than the corresponding components shown in FIG. 5. The side members 66 and 67 and the top core 68 include tapered surfaces. A tapered metal hoop 69 is enclosed between the side members 66 and 67 and the top core 68.

To mount the hoop 69 within the mold 65, the side elements 66 and 67 are first extended to their closed position to form a nest for the hoop 69. The flared hoop 69 is placed in the nest and the top core 68 lowered to clamp the hoop 69 against the side elements 66 and 67. The tapered surfaces of the side elements 66 and 67 cooperate with the tapered hoop 69 to vertically position the lower end of the hoop 69 within the drop well portion 53 of the mold cavity 51. Additionally, use of the tapered hoop 69 eliminates the hoop flaring operation which was described above as one of the steps of forming the wheel rim. Upon closing the mold 65 by lowering the top core 68 into place, the tapered hoop 69 is completely enclosed within the mold 65.

Once the hoop 69 is mounted within the mold 65, the process of casting the wheel disc proceeds as described above. While the preferred embodiment has been illustrated and described, it will be appreciated that the mold 45 shown in FIGS. 4 and 5 can be modified to receive a tapered metal hoop 69 (not shown). Similarly, the mold 65 shown in FIG. 6 can be modified to receive a cylindrical hoop 41 (not shown) and the lower end of the tapered hoop 69 can be formed into a portion of a vehicle wheel, as described above and illustrated in FIG. 5.

Figure 7:
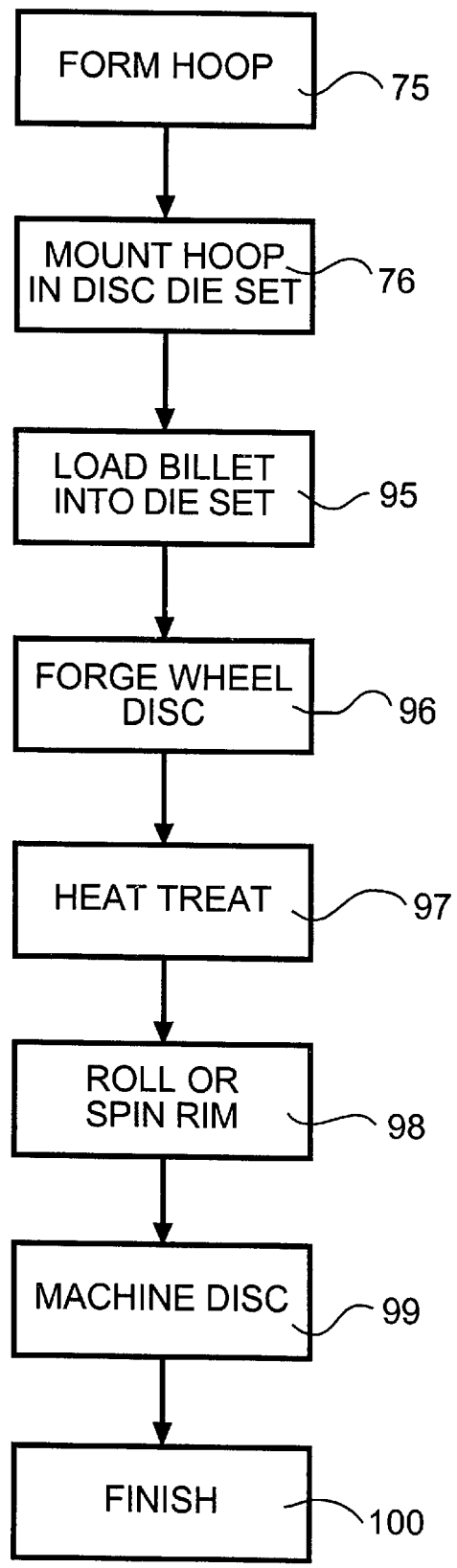
FIG. 7 is a flow chart for an alternate process for fabricating a vehicle wheel in accordance with the invention.
Figure 8:
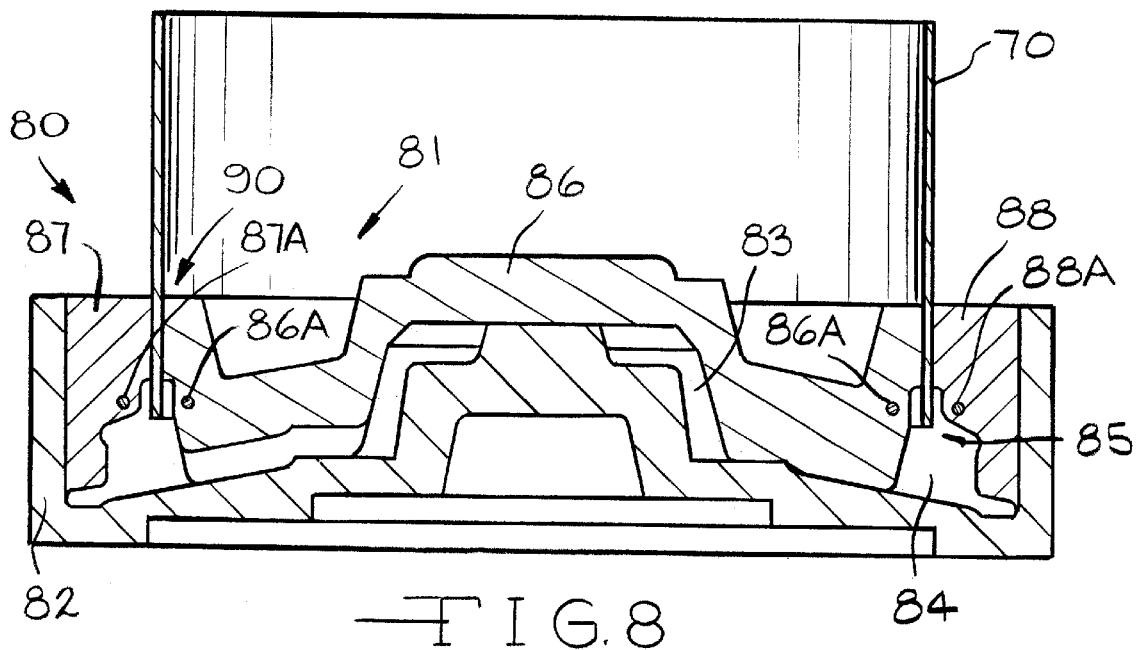
FIG. 8 is a sectional view of a die set used in the process illustrated in FIG. 7.

As indicated above, a forged wheel disc also can be used to form a two piece wheel. An alternate embodiment of the invention contemplates utilizing a forging process for forming the wheel disc. The alternate embodiment is illustrated in the flow chart shown in FIG. 7. Similar to the process described above, a strip of metal is formed into a cylindrical hoop 70 in functional block 75. In functional block 76, the metal hoop 70 is mounted upon a set of wheel disc dies 80, as illustrated in FIG. 8. The die set 80 includes a multi-piece upper die 81 and a lower die 82. The upper die 81 is axially movable relative to the lower die 82 between closed and open positions by a conventional mechanism (not shown). In the closed position, the upper die 81 extends into and cooperates with the lower die 82 to define a die cavity 83, as illustrated in FIG. 8. The die cavity 83 has an annular sidewall cavity 84 which corresponds to the wheel disc sidewall. The sidewall cavity 84 includes an annular portion 85 which extends axially therefrom. The annular portion 85 of the sidewall cavity 84 corresponds to a portion of a wheel disc deepwell. In the open position, the upper die 81 is completely withdrawn from the lower die 82.

The upper die 81 includes a center element 86 which is disposed between a pair of horizontally movable side elements 87 and 88. The center element 86A includes an optional annular supplemental heating element 86A. The heating element 86A is of conventional design, such as inductive or electrical resistance heating elements. Similarly, the side elements 87 and 88 can include optional arcuate shaped supplemental heating segments, 87A and 87B, respectively, of conventional design. The purpose for the heating element 86A and segments 87A and 88A will be discussed below.

When the upper die 81 is in the closed position, as shown in FIG. 8, the side elements 87 and 88 are extended toward the center element 86, defining an annular opening 90 therebetween. When the upper die 81 is in the open position, the side elements 87 and 88 can be retracted horizontally from the center element 86. For clarity, the mechanism for extending and retracting the side elements 87 and 88 relative to the center element 86 has been omitted from FIG. 8.

Mounting the metal hoop 70 upon the upper die 81 begins by vertically withdrawing the upper die 81 from the lower die 82. The side elements 87 and 88 are then horizontally retracted from the center element 86. The metal hoop 70 is positioned with one end extending over the outer circumference of the center element 86. As described above, a circumferential groove or bead (not shown) can be formed in the hoop 70 to facilitate positioning the hoop 70 upon the center element 86. The side elements 87 and 88 are extended toward the center element 86, clamping the hoop 70 against the center element 86. The lower end of the hoop 70 forms a seal between the side elements 87 and 88 and the center element 86. When the die set 80 is closed, as shown in FIG. 8, the lower end of the metal hoop 70 extends through the annular opening 90 and into the annular cavity 85 of the die cavity 83. The clamping of the side elements 87 and 88 against the metal hoop 70 assures that the hoop 70 is positioned coaxially within the die cavity 83.

After the metal hoop 70 is mounted on the upper die 81, the die set 80 is ready for forging the wheel disc. A billet of metal (not shown), which has been heated to a temperature which is slightly less than its melting temperature, is placed upon the lower die 82 in functional block 95. A conventional forging process, such as squeeze forging, forms the billet into a wheel disc, as shown in functional block 96. During the forging process, the upper die 81 is pressed downward into the lower die 82. As the dies 81 and 82 are pressed together, the metal billet is squeezed into the die cavity 83, filling the die sidewall cavity 84 and the annular portions 85 thereof. The heated metal flows over the lower end of the metal hoop 70. In the preferred embodiment, the metal billet is sufficiently hot to bond to the surface of the lower end of the hoop 70. Additionally, the lower end of the metal hoop 70 can include a plurality of holes or be serrated, as described above. During the forging process, the pressure forces the metal of the billet into the holes or serrations, to enhance the bond formed between the wheel disc and the hoop 70. If included, the supplemental heating segments 87A and 88A and the supplemental heating element 86A provide additional heat energy to the annular portion 85 of the sidewall cavity 84 to partially melt the end of the metal hoop 70 to further enhance the bond between the hoop end and the wheel disc.

As the forged metal billet cools, the wheel disc drop well portion is physically bonded to the end of the metal hoop 70, securely attaching the end of the metal hoop 70 to the wheel disc. The metal in the wheel disc drop well portion contracts as it cools, forming an air tight seal between the metal hoop 70 and the wheel disc.

After the wheel disc has cooled sufficiently, the upper die 81 is retracted vertically to its open position, withdrawing the wheel disc from the lower die 82. The side elements 87 and 88 are then retracted horizontally from the center element 86, allowing removal of the wheel disc and hoop 70. Once removed from the die set 80, the wheel disc can be quenched. In functional block 97, the wheel disc is heat treated by a conventional method. In functional block 98, the hoop 70 is formed into a wheel rim by a conventional process, such as rolling or spinning. To facilitate the forming operation, the hoop 70 can be flared before rolling or spinning. The wheel disc forging is machined to a final shape in functional block 99. Because forging produces a wheel disc having a near final shape, the machining operations are minimized. The combination of the forming of the wheel rim and machining of the wheel disc after the wheel disc is forged onto the end of the hoop 70 assures that the inboard and outboard tire bead seats are concentric. An optional decorative finish, such as, for example plating, paint and/or clear coat is applied to the surface of the wheel disc in functional block 100.

Figure 9:
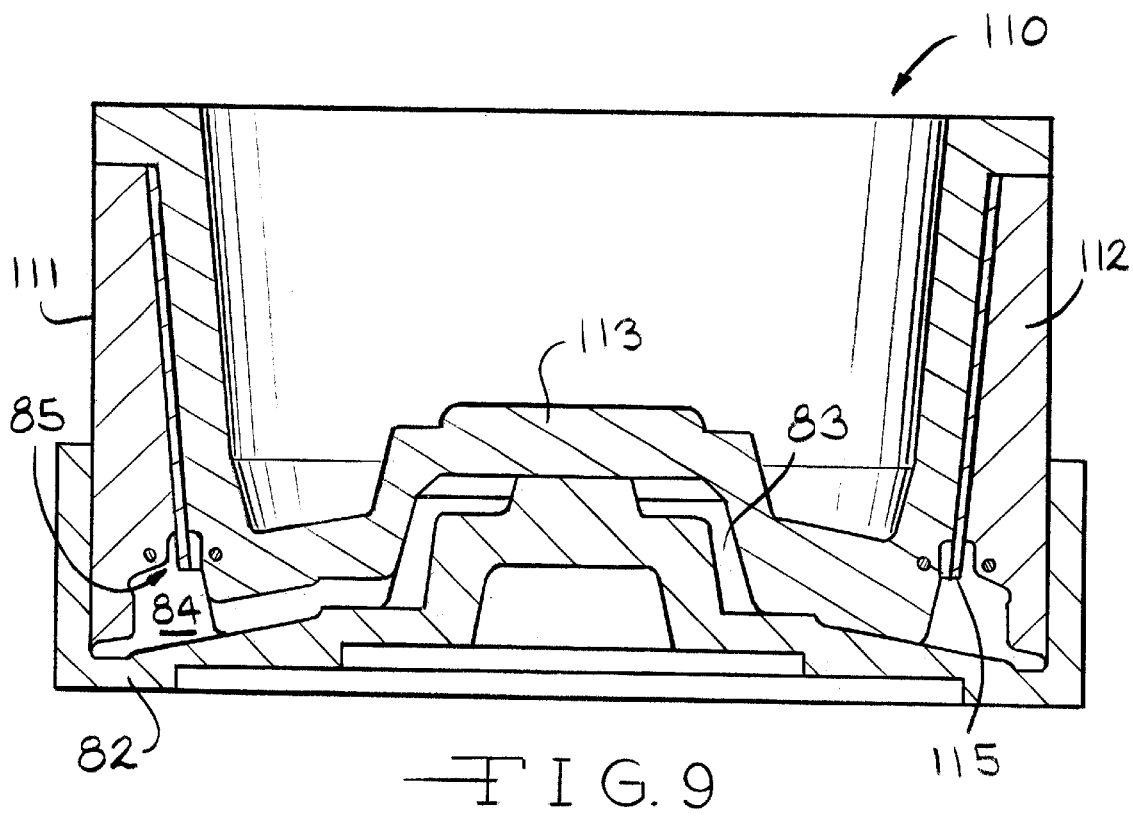
FIG. 9 is a sectional view of an alternate die set used in the process illustrated in FIG. 7.

An alternate embodiment of the wheel disc die set is illustrated at 110 in FIG. 9. Components shown in FIG. 9 which are similar to components in FIG. 8 have the same numerical designators. As shown in FIG. 9, the die set 110 includes side elements 111 and 112 and a center element 113 which have a greater height than the corresponding elements shown in FIG. 8. The side elements 111 and 112 and the center element 113 include tapered surfaces. A tapered metal hoop 115 is enclosed between the side elements 111 and 112 and the center element 113.

To mount the hoop 115 within the die set 110, the side elements 111 and 112 are first extended to their closed position to form a nest for the hoop 115. The hoop 115 is then placed in the nest and the center element 113 lowered to clamp the hoop 115 against the side elements 111 and 112. The tapered surfaces of the side elements 111 and 112 cooperate with the tapered hoop 115 to vertically position the lower end of the hoop 115 within the annular portion 85 of the sidewall cavity 84. Additionally, use of the tapered hoop 115 eliminates the operation of flaring the hoop described above as one of the steps for forming the wheel rim. Once the hoop 115 is mounted within the die set 110, the process of forging continues as described above. While the preferred embodiment has been illustrated and described, it will be appreciated that the die set mold 81 shown in FIG. 8 can be modified to receive a tapered metal hoop 115 (not shown). Similarly, the die set 110 shown in FIG. 9 can be modified to receive a cylindrical hoop 70 (not shown).

Figure 10:
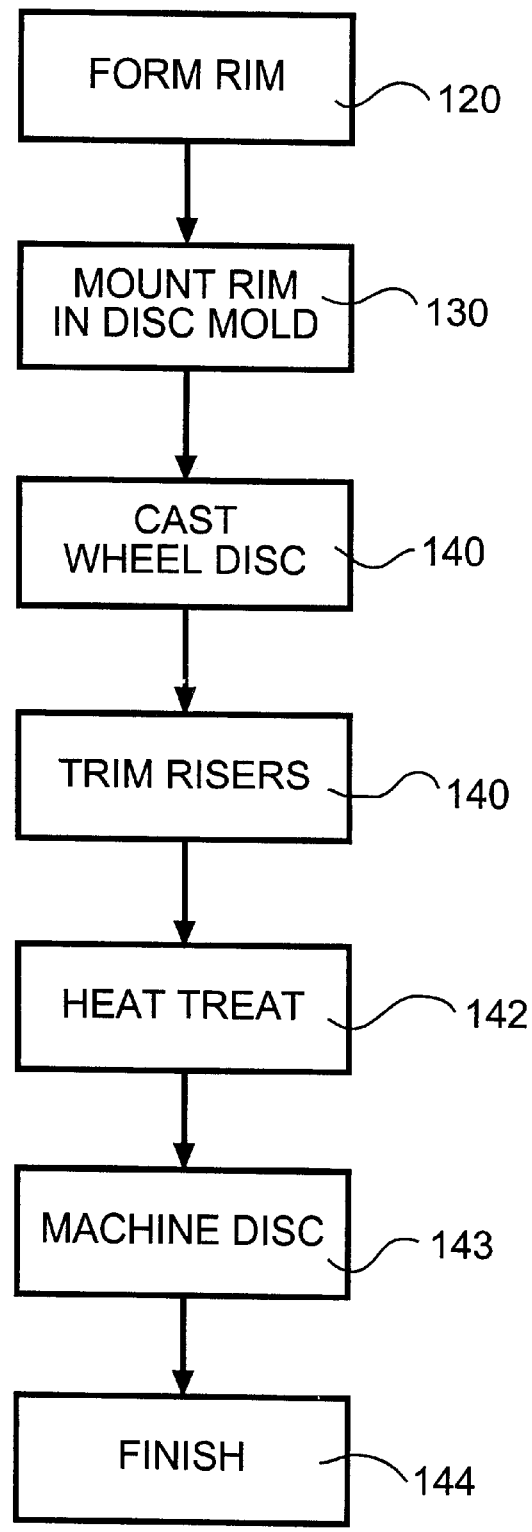
FIG. 10 is a flow chart for another alternate process for fabricating a vehicle wheel in accordance with the invention.
Figure 11:
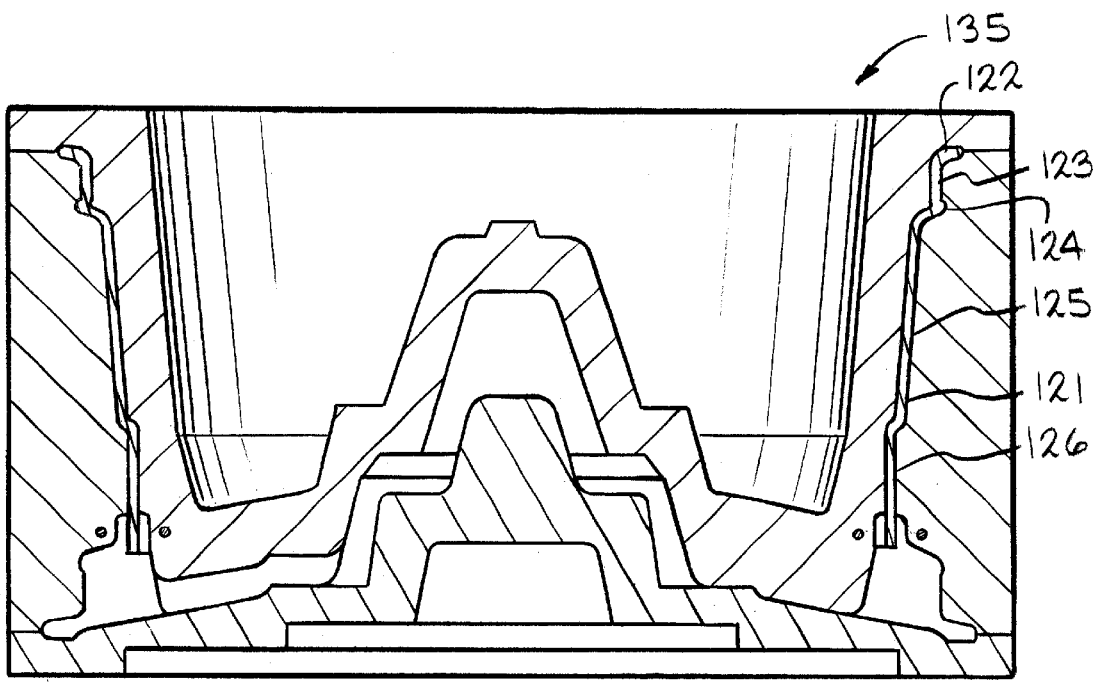
FIG. 11 is a sectional view of a wheel mold and partial wheel rim used in the process illustrated in FIG. 10.

Another alternate embodiment of the invention is illustrated by the flow chart shown in FIG. 10. In functional block 120, a partial wheel rim 121, which is shown in section in FIG. 11, is formed by a conventional process, such as rolling or spinning. As shown in FIG. 11, the partial wheel rim 121 includes an inboard tire bead retaining flange 122 which extends radially from an inboard tire bead seat 123. An inboard safety bead 124 is formed on the outboard end of the tire bead seat 123. A leg portion 125 extends axially from the inboard safety bead 124. The leg portion 125 terminates in a cylindrical portion of a deepwell 126.

In functional block 130, the wheel rim 121 is mounted in a multi-piece wheel disc mold 135. Similar to the molds described above, optional supplemental heating elements can be included in the mold members. As shown in FIG. 11, the wheel disc mold 135 completely encloses the wheel rim 121, similar to the mold 65 shown in FIG. 6. Alternately, a mold (not shown) which is similar to the mold 45 shown in FIG. 4 and which encloses only the lower end of the drop well portion 126 of the wheel rim 121 can be used.

In functional block 140, molten metal is introduced to the mold cavity through a sprue (not shown), by a conventional method, such as gravity or low pressure casting, to cast a wheel disc (not shown). The molten metal fills the annular mold cavity portions, covering and partially melting the surface of the lower end of the drop well portion 126 of the wheel rim 121. Additional heat may be supplied by the supplemental heating elements to assure that partial melting occurs. As the molten metal cools to form the wheel disc casting, the drop well portion of the wheel disc casting is physically bonded to the lower end of deepwell portion 126 of the wheel rim 121, securely attaching the wheel rim 121 to the wheel disc casting. To further facilitate the attachment, a plurality of holes (not shown) can be formed through the lower end of the deepwell portion 126 of the wheel rim 121, as described above. Additionally, the lower end of the deepwell portion 126 of the wheel rim 121 can include serrations, as shown in FIG. 5. The metal in the wheel disc deepwell portion of the mold cavity contracts as it cools, forming an air tight seal between the wheel rim 121 and the wheel disc casting.

After the wheel disc casting has cooled sufficiently, the top core and the side members of the mold 135 are retracted allowing removal of the wheel rim 121 and wheel disc casting from the mold bottom member. The wheel disc casting is typically quenched. In functional block 141, any risers and sprues are trimmed from the wheel disc casting. The wheel disc casting is then heat treated by a conventional process as shown in functional block 142. The wheel disc casting is machined to a final shape in functional block 143. The machining of the wheel disc after the wheel disc is cast onto the end of the wheel rim 121 assures that the inboard and outboard tire bead seats of the finished wheel are concentric. An optional decorative finish, such as, for example plating, paint and/or clear coat are applied to the surface of the wheel disc in functional block 144.

Figure 12:
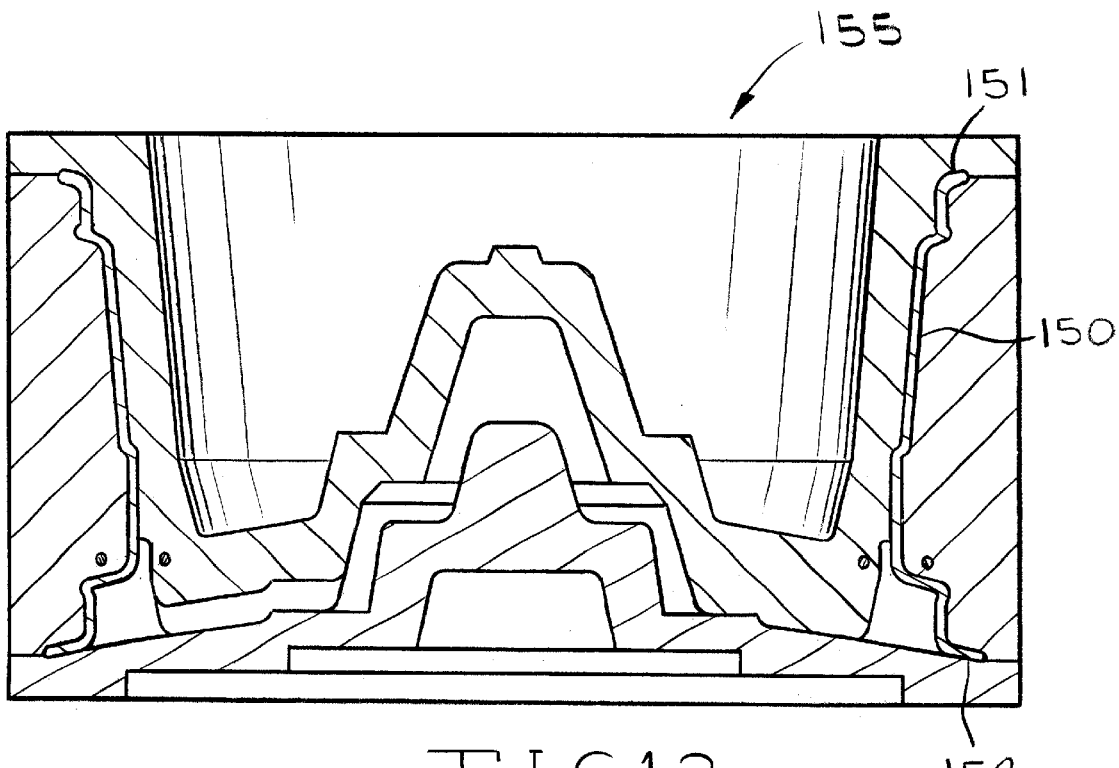
FIG. 12 is another sectional view of the wheel mold shown in FIG. 11 and a full wheel rim used in the process illustrated in FIG. 10.

Another embodiment of the process is shown in FIG. 12 where a completely formed full wheel rim 150, having both an inboard tire retaining flange 151 and an outboard tire retaining flange 152, is loaded into a multi-piece wheel mold 155. A wheel disc or spider (not shown) is then cast within the wheel rim 150. It will be appreciated that while the preferred embodiment is shown for casting the wheel disc or spider at an end of the wheel rim, 150, the invention also can be practiced to cast a wheel disc or spider which is recessed within the wheel rim 150 (not shown). Alternately, a mold (not shown) which is similar to the mold 45 shown in FIG. 4 and which encloses only the outboard end of the wheel rim 150 can be used.

While the process in FIG. 10 has been described and illustrated for casting a wheel component onto an end of a partial or full wheel rim, it will be appreciated that the invention also contemplates forging a wheel component onto the end of a partial or full wheel rim (not shown).

By casting or forging a wheel disc onto an end of a metal hoop or wheel rim, the welding operation is eliminated from the fabrication of a two piece wheel.

Figure 13:
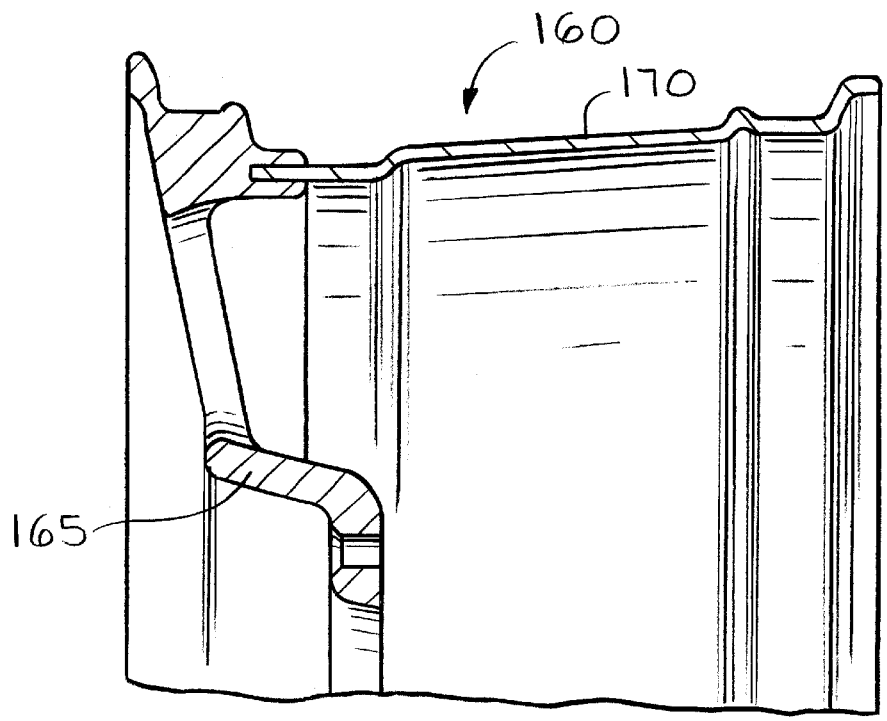
FIG. 13 is a sectional view of a vehicle wheel formed in accordance with the invention.

A partial sectional view of a typical vehicle wheel 160 formed by the process described above in FIGS. 3 through 11 is shown in FIG. 13. As illustrated in FIG. 13, the wheel 160 includes a fill face wheel disc 165 which is cast or forged upon the outboard end of a partial wheel rim 170. Accordingly, the weld which is required to fabricate prior art two piece wheels has been eliminated from the wheel 160. Additionally, the present invention contemplates forming the wheel 160 without a weld anchor. While the wheel 160 is illustrated with the wheel rim 170 joined to the wheel disc 165 in the deep well, it will be appreciated that the invention also can be practiced to join the wheel rim to the wheel disc at other locations, such as, for example, at the tire bead seat (not shown). The invention further contemplates casting or forging the wheel disc 165 from either the same or a different metal than the metal used to form the wheel rim 170.

Figure 14:
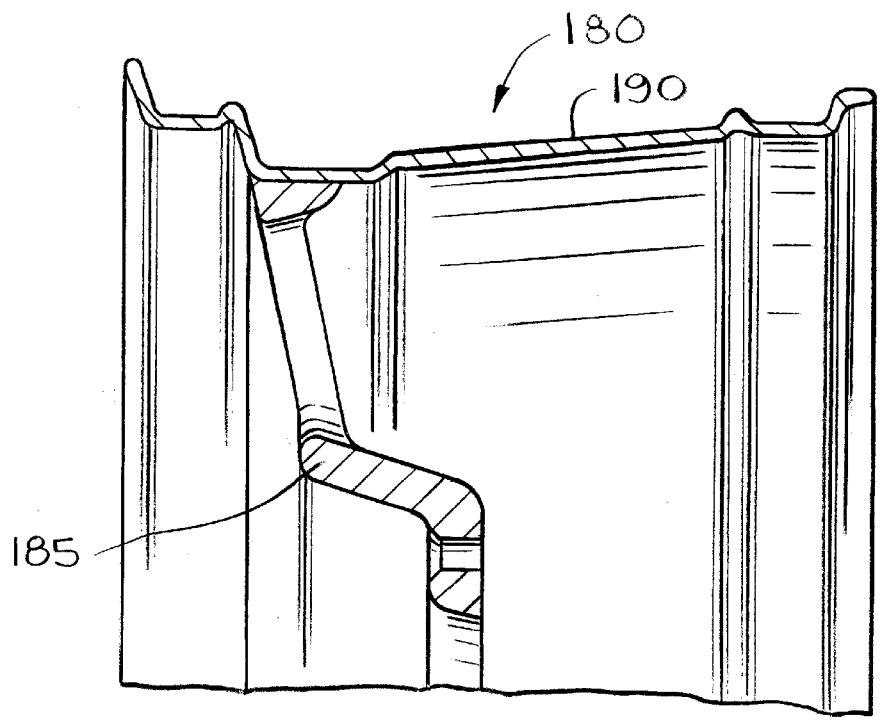
FIG. 14 is a sectional view of an alternate embodiment of the vehicle wheel shown in FIG. 13.

A partial sectional view of a typical vehicle wheel 180 formed by the process described above in FIG. 12 is shown in FIG. 14. As illustrated in FIG. 14, the wheel 180 includes a wheel disc 185 which is cast or forged within the outboard end of a partial wheel rim 190. Additionally, the wheel disc 185 is recessed from the outboard end of the wheel rim 190. Alternately, a wheel spider (not shown) can be disposed within the wheel rim 190. The invention further contemplates casting or forging the wheel disc 185 from either the same or a different metal than the metal used to form the wheel rim 190.

The invention also contemplates vibrating the apparatus while the wheel disc is cast or forged (not shown). In the preferred embodiment, ultrasonic energy is applied to the wheel mold or die set during the process. Alternately, the vibration can be applied to the metal hoop or wheel rim, or to both the mold or die set and metal hoop or wheel rim. The vibration breaks up oxidation which may form upon the wheel hoop or wheel rim end upon first contact with the metal charge or billet. Breaking up of the oxidation enhances formation of the bond between the wheel disc and the hoop or rim.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while supplemental heating elements have been shown in both the side members and top cores, it will be appreciated that the invention also can be practiced with supplemental heating elements in only the side members or the top core.

What is claimed is:

1. A process for fabricating a vehicle wheel comprising the steps of:

(a) forming a full wheel rim having an inboard tire bead retaining flange and an outboard tire bead retaining flange;

(b) mounting the wheel rim in a wheel disc mold, the wheel mold completely enclosing the wheel rim;

(c) casting a wheel disc within the wheel rim;

(d) removing the wheel disc casting and wheel rim from the wheel disc mold; and (e) finishing the wheel disc casting.

* * * * *